(12) United States Patent
Naganawa et al.

(10) Patent No.: US 8,890,400 B2
(45) Date of Patent: Nov. 18, 2014

(54) LUMINESCENT COMPOSITION AND INORGANIC ELECTROLUMINESCENT SHEET USING THE SAME

(75) Inventors: Satoshi Naganawa, Saitama (JP); Takashi Morioka, Saitama (JP); Naoki Taya, Saitama (JP); Takeshi Kondo, Saitama (JP); Kazue Saito, Ibaraki (JP); Yuko Iwamoto, Saitama (JP); Shinichi Hoshi, Saitama (JP); Yumiko Matsubayashi, Saitama (JP)

(73) Assignee: Lintec Corporation, Tokyo (JP)

( * ) Notice: Subject to any disclaimer, the term of this patent is extended or adjusted under 35 U.S.C. 154(b) by 0 days.

(21) Appl. No.: 12/993,610

(22) PCT Filed: May 18, 2009

(86) PCT No.: PCT/JP2009/059132
§ 371 (c)(1),
(2), (4) Date: Nov. 22, 2010

(87) PCT Pub. No.: WO2009/142173
PCT Pub. Date: Nov. 26, 2009

(65) Prior Publication Data
US 2011/0068681 A1 Mar. 24, 2011

(30) Foreign Application Priority Data

May 22, 2008 (JP) .................... 2008-134675
May 22, 2008 (JP) .................... 2008-134677
Feb. 27, 2009 (JP) .................... 2009-046584

(51) Int. Cl.
*H01J 1/62* (2006.01)
*H01J 63/04* (2006.01)
(Continued)

(52) U.S. Cl.
CPC .............. *H05B 33/10* (2013.01); *C09K 11/02* (2013.01); *H05B 33/14* (2013.01);
(Continued)

(58) Field of Classification Search
USPC ................ 313/498, 502, 503, 506, 509; 445/23–25, 58
See application file for complete search history.

(56) References Cited

U.S. PATENT DOCUMENTS 3,114,045 A * 12/1963 Mash .................. 250/214 LA
3,166,687 A * 1/1965 Veres ..................... 313/509
(Continued)

FOREIGN PATENT DOCUMENTS

JP  2-75194   3/1990
JP  4-190586  7/1992
(Continued)

OTHER PUBLICATIONS

Extended European Search Report issued Feb. 17, 2012, in Patent Application No. 09750535.8.
(Continued)

*Primary Examiner* — Thomas A Hollweg
(74) *Attorney, Agent, or Firm* — Oblon, Spivak, McClelland, Maier & Neustadt, L.L.P.

(57) ABSTRACT

The present invention provides a luminescent composition which is capable of providing an inorganic electroluminescent sheet with a high productivity at low costs in an efficient manner, and has a desired light transmittance (transparency) when no electric voltage is applied thereto, an inorganic electroluminescent sheet obtained from the luminescent composition which can be mass-produced, and a process for producing the inorganic electroluminescent sheet. The present invention relates to a luminescent composition including an inorganic electroluminescent substance and a binder resin, wherein a content of the inorganic electroluminescent substance is not less than 0.5 part by mass and less than 100 parts by mass on the basis of 100 parts by mass of the binder resin; and an inorganic electroluminescent sheet including at least a first transparent substrate, a first transparent electrode, an inorganic electroluminescent layer, a first transparent electrode and a second transparent substrate which are successively laminated in this order, wherein the inorganic electroluminescent layer is formed from the above luminescent composition, and the inorganic electroluminescent sheet has a light transmittance of 60% or more as measured at a wavelength of 550 nm under a non-light emitting condition.

19 Claims, 1 Drawing Sheet

| 2: Second Transparent Substrate |
|---|
| $E^2$: Second Transparent Electrode |
| L: Inorganic Electroluminescent Layer |
| $E^1$: First Transparent Electrode |
| 1: First Transparent Substrate |

(51) Int. Cl.
  *H05B 33/10*  (2006.01)
  *C09K 11/02*  (2006.01)
  *H05B 33/14*  (2006.01)
  *H05B 33/20*  (2006.01)

(52) U.S. Cl.
  CPC .................................... *H05B 33/20* (2013.01)
  USPC .......... 313/498; 313/502; 313/503; 313/506; 313/509; 445/23; 445/24; 445/25; 445/58

(56) References Cited

U.S. PATENT DOCUMENTS

| | | | | |
|---|---|---|---|---|
| 4,413,090 | A * | 11/1983 | Shoji et al. | 525/59 |
| 5,076,963 | A | 12/1991 | Kameyama et al. | |
| 5,552,668 | A | 9/1996 | Hirose et al. | |
| 5,686,979 | A * | 11/1997 | Weber et al. | 349/96 |
| 5,830,028 | A | 11/1998 | Zovko et al. | |
| 6,181,301 | B1 * | 1/2001 | Inoguchi et al. | 345/5 |
| 6,542,146 | B1 * | 4/2003 | Toffolo et al. | 345/156 |
| 7,625,094 | B2 * | 12/2009 | Nakamura et al. | 362/84 |
| 7,824,936 | B2 * | 11/2010 | Park et al. | 438/22 |
| 2002/0140346 | A1 | 10/2002 | Tsukiyama | |
| 2002/0195931 | A1 | 12/2002 | George et al. | |
| 2003/0015962 | A1 * | 1/2003 | Murasko et al. | 313/509 |
| 2006/0097633 | A1 * | 5/2006 | Cho et al. | 313/512 |
| 2007/0177370 | A1 * | 8/2007 | Nakamura et al. | 362/84 |
| 2007/0286966 | A1 * | 12/2007 | Chen et al. | 427/569 |
| 2008/0029373 | A1 * | 2/2008 | Hotta et al. | 200/314 |
| 2008/0090030 | A1 * | 4/2008 | Okuji et al. | 428/29 |
| 2009/0023233 | A1 * | 1/2009 | Park et al. | 438/22 |
| 2009/0218942 | A1 * | 9/2009 | Shirata | 313/509 |
| 2012/0242220 | A1 * | 9/2012 | Naganawa et al. | 313/509 |

FOREIGN PATENT DOCUMENTS

| | | |
|---|---|---|
| JP | 4 220996 | 8/1992 |
| JP | 7 58636 | 6/1995 |
| JP | 11-307265 | 11/1999 |
| JP | 11-329722 A | 11/1999 |
| JP | 2002-190388 A | 7/2002 |
| JP | 2002-329581 | 11/2002 |
| JP | 2003-15557 | 1/2003 |
| JP | 2005-290068 | 10/2005 |
| JP | 2006 236925 | 9/2006 |
| JP | 2007 134121 | 5/2007 |
| JP | 2007 299606 | 11/2007 |
| JP | 2008 60083 | 3/2008 |

OTHER PUBLICATIONS

Marie-Pierre Gelin, et al. "Radical solution copolymerization of vinylidene fluoride with hexafluoropropene", Journal of Fluorine Chemistry, vol. 126, No. 4, XP 27851711, Apr. 2005, pp. 577-585.
International Search Report issued Aug. 11, 2009 in PCT/JP09/059132 filed May 18, 2009.
Office Action issued May 21, 2013, in Japanese Patent Application No. 2009-046592.
Japanese Office Action issued Nov. 13, 2012, in Japan Patent Application No. 2009-046594.

* cited by examiner

FIG. 1

| 2: Second Transparent Substrate |
|---|
| E²: Second Transparent Electrode |
| L: Inorganic Electroluminescent Layer |
| E¹: First Transparent Electrode |
| 1: First Transparent Substrate |

FIG. 2

| 2: Second Transparent Substrate |
|---|
| E²: Second Transparent Electrode |
| L: Inorganic Electroluminescent Layer |
| D: Dielectric Layer |
| E¹: First Transparent Electrode |
| 1: First Transparent Substrate |

FIG. 3

| 2: Second Transparent Substrate |
|---|
| E²: Second Transparent Electrode |
| D: Dielectric Layer |
| L: Inorganic Electroluminescent Layer |
| E¹: First Transparent Electrode |
| 1: First Transparent Substrate |

FIG. 4

| 2: Second Transparent Substrate |
|---|
| E²: Second Transparent Electrode |
| D': Dielectric Layer |
| L: Inorganic Electroluminescent Layer |
| D: Dielectric Layer |
| E¹: First Transparent Electrode |
| 1: First Transparent Substrate |

LUMINESCENT COMPOSITION AND INORGANIC ELECTROLUMINESCENT SHEET USING THE SAME

TECHNICAL FIELD

The present invention relates to luminescent compositions, inorganic electroluminescent sheets using the luminescent compositions, and a process for producing the electroluminescent sheets.

BACKGROUND ART

As functional devices used in electric and electronic applications and optical applications, there are known electroluminescent devices capable of emitting light by applying an electric voltage thereto. The electroluminescent devices are generally classified into inorganic electroluminescent devices having a light-emitting layer formed of an inorganic electroluminescent material, and organic electroluminescent devices having a light-emitting layer formed of an organic electroluminescent material.

In particular, the organic electroluminescent devices using a thin film material which is excited and emits light by flowing an electric current therethrough have a large latent possibility of use in extensive applications including displays for cellular phones, personal digital assistants (PDA), displays for computers, information displays for automobiles, TV monitors and general illumination apparatuses, because they are capable of emitting light with a high luminance even by applying a low electric voltage thereto.

On the other hand, the inorganic electroluminescent materials are effective as an illumination element requiring a good flexibility because they are formed into devices on a paper or a polymer film by printing techniques. In addition, the inorganic electroluminescent materials are less capable of emitting light with a high luminance as compared to the organic electroluminescent materials, but have advantages such as excellent long-term stability and stable light emission even under severe conditions such as high-temperature conditions. For these reasons, the inorganic electroluminescent devices having a light-emitting layer formed of the inorganic electroluminescent materials have been studied and researched for utilization in the application fields for which a good weather resistance, a good heat resistance, a good long-term stability, etc., are needed.

As one of the electroluminescent devices using the inorganic electroluminescent materials, there are known electroluminescent sheets. The electroluminescent sheets usually have such a structure in which a substrate, an electrode and an electroluminescent layer are successively laminated. The electroluminescent layer in the electroluminescent sheets is formed of the inorganic electroluminescent materials.

The electroluminescent sheets are used, for example, as a back light for advertizing media and decorating media which are disposed on windows of commercial buildings or automobiles, or security sheets, etc., because they are excellent in weather resistance, heat resistance and long-term stability.

For example, Patent Document 1 discloses and proposes an advertizing method using a sign board in which images indicating an object to be advertized are provided on a surface of a film-shaped illuminant, and an advertizing sign board in which images indicating an object to be advertized are provided on a surface of a film-shaped illuminant. In Patent Document 1, it is described that the film-shaped illuminant is constructed from an electroluminescent device having a pair of electrode layers and an electroluminescent layer interposed between the electrode layers which is capable of emitting light by applying an electric field thereto. The electroluminescent layer is made of an inorganic electroluminescent material such as zinc sulfide and zinc oxide. In addition, in Patent Document 2, there is disclosed an electroluminescent lamp in which a light-emitting layer, a dielectric layer and a back electrode are successively laminated on a transparent electrode formed on a transparent film made of polyethylene terephthalate, etc.

Meanwhile, with recent high consciousness of ensuring the privacy, studies have been made on the application of the electroluminescent sheets to members for privacy protection which are to be fitted to windows of vehicles or buildings such as commercial buildings and houses. Therefore, the light transmittance (transparency) of the electroluminescent sheets becomes important as one of properties required therefor. However, the light-emitting members as disclosed in Patent Documents 1 and 2 fail to exhibit a good light transmittance so that a back side of these members is invisible and unrecognizable, for example, when attached onto a transparent substrate such as a window glass.

The electroluminescent layer made of the inorganic electroluminescent material is generally formed by a sintering method, a laser abrasion method, a molecular beam epitaxy (MBE) method, a physical vapor deposition (PVD) such as a sputtering method and a vacuum deposition method, or a chemical vapor deposition (CVD) method (for example, refer to Patent Document 3). However, since these methods need complicated procedures or use of expensive apparatuses, there tends to occur such a problem that the electroluminescent devices obtained by the methods inevitably become very expensive.

To solve the above problem, there is disclosed, for example, an electroluminescent lamp having such a layer structure in which an electroluminescent layer, a dielectric layer and a back electrode are successively laminated on a transparent electrode formed on a transparent film by a screen printing method, etc., using coating materials prepared by respectively dispersing an inorganic electroluminescent material obtained by activating zinc sulfide with copper and a high-dielectric material such as barium titanate in an organic binder (for example, refer to Patent Document 4).

The above technique described in Patent Document 4 may be performed without need of expensive apparatuses and complicated operations as compared to the technique described in Patent Document 3, but requires a number of steps and is unsuitable for mass production of the aimed product.

Patent Document 1: JP-A 2003-15557
Patent Document 2: JP-B 7-58636
Patent Document 3: JP-A 2005-290068
Patent Document 4: JP-A 4-190586

BRIEF DESCRIPTION OF THE DRAWINGS

FIG. 1 is a schematic sectional view showing a construction (a) of an inorganic electroluminescent sheet according to the present invention.

FIG. 2 is a schematic sectional view showing a construction (b) of an inorganic electroluminescent sheet according to the present invention.

FIG. 3 is a schematic sectional view showing a construction (c) of an inorganic electroluminescent sheet according to the present invention.

FIG. 4 is a schematic sectional view showing a construction (d) of an inorganic electroluminescent sheet according to the present invention.

DISCLOSURE OF THE INVENTION

Problems to be Solved by the Invention

The present invention has been made in view of the above problems. An object of the present invention is to provide luminescent compositions which are capable of providing inorganic electroluminescent sheets with a high productivity at low costs in an efficient manner, and have a desired light transmittance (transparency) when no electric voltage is applied thereto, electroluminescent sheets obtained from the luminescent compositions which can be mass-produced, and a process for producing the electroluminescent sheets.

Means for Solving the Problems

As the result of various extensive and intensive researches for achieving the above object, the present inventors have found that the above problems can be solved by the luminescent composition constituted from an inorganic electroluminescent substance and a binder resin in which a content of the inorganic electroluminescent substance is adjusted to a specific range. The present invention has been accomplished on the basis of the above finding.

Thus, the present invention provides the luminescent composition, the inorganic electroluminescent sheet and the process for producing the inorganic electroluminescent sheet as described below.

1. A luminescent composition including an inorganic electroluminescent substance and a binder resin, wherein a content of the inorganic electroluminescent substance is not less than 0.5 part by mass and less than 100 parts by mass on the basis of 100 parts by mass of the binder resin.
2. The luminescent composition as described in the above 1, wherein the binder resin has a glass transition temperature of from −70 to 5° C.
3. The luminescent composition as described in the above 1 or 2, wherein the binder resin is a thermoplastic resin having a softening point of from 30 to 270° C.
4. The luminescent composition as described in any one of the above 1 to 3, further including a precipitation inhibitor.
5. The luminescent composition as described in any one of the above 1 to 4, further including a luminescent color modifier.
6. The luminescent composition as described in any one of the above 1 to 5, further including at least one material selected from the group consisting of an ultraviolet absorber and an infrared absorber.
7. An inorganic electroluminescent sheet including at least a first transparent substrate, a first transparent electrode, an inorganic electroluminescent layer, a second transparent electrode and a second transparent substrate which are successively laminated in this order, wherein the inorganic electroluminescent layer is formed from the luminescent composition as described in any one of the above 1 to 6, and the inorganic electroluminescent sheet has a light transmittance of 60% or more as measured at a wavelength of 550 nm under a non-light emitting condition.
8. A process for producing an inorganic electroluminescent sheet, including the steps of preparing a first laminate and a second laminate by the following step (1) or (2); and bonding a side of the inorganic electroluminescent layer of the first laminate to a side of the second transparent electrode of the second laminate, or bonding a side of the first transparent electrode of the first laminate to a side of the inorganic electroluminescent layer of the second laminate:

Step (1): laminate preparing step including successively forming at least the first transparent electrode and the inorganic electroluminescent layer on the first transparent substrate to prepare the first laminate, and separately forming at least the second transparent electrode on the second transparent substrate to prepare the second laminate; or Step (2): laminate preparing step including forming at least the first transparent electrode on the first transparent substrate to prepare the first laminate, and separately successively forming at least the second transparent electrode and the inorganic electroluminescent layer on the second transparent substrate to prepare the second laminate.

Effect of the Invention

In accordance with the present invention, there can be provided a luminescent composition which is capable of providing an inorganic electroluminescent sheet with a high productivity at low costs in an efficient manner, and has a desired light transmittance (transparency) when no electric voltage is applied thereto (under a non-light emitting condition), an inorganic electroluminescent sheet obtained by using the luminescent composition which can be mass-produced, and a process for producing the inorganic electroluminescent sheet.

BEST MODE FOR CARRYING OUT THE INVENTION

First, the luminescent composition of the present invention is described.

[Luminescent Composition]

The luminescent composition of the present invention is characterized by including an electroluminescent substance and a binder resin, wherein a content of the inorganic electroluminescent substance is not less than 0.5 part by mass and less than 100 parts by mass on the basis of 100 parts by mass of the binder resin. Examples of the preferred binder resin include pressure-sensitive adhesive resins having a glass transition temperature of from −70 to 5° C. (hereinafter occasionally referred to as "matrix resins") or thermoplastic resins having a softening point of from 30 to 270° C. (hereinafter occasionally referred to as merely "thermoplastic resins"). In addition, there may also be suitably used those resins having a glass transition temperature of from −70 to 5° C. and a softening point of from 30 to 270° C.

<<Matrix Resin>>

It is important that the matrix resin preferably used in the luminescent composition of the present invention exhibits a pressure-sensitive adhesion property at an ordinary temperature, and allows the below-mentioned inorganic electroluminescent layer formed therefrom to bond to the other layers only by facing each other and applying a pressing force thereto when bonding these layers together. In addition, it is important that the matrix resin has such a property capable of preventing the inorganic electroluminescent layer from being squeezed out from an edge of the below-mentioned inorganic electroluminescent sheet (hereinafter referred to as a "squeeze-out property"). In order to exhibit the above properties, the matrix resin is required to have a glass transition temperature Tg of preferably from −70 to 5° C., more preferably from −60 to −15° C. and still more preferably from −55 to −25° C. The matrix resin having a glass transition temperature Tg within the above-specified range can maintain a sufficient cohesion force and therefore can be hardly oozed and squeezed out from an edge of the resulting inorganic electroluminescent sheet. In addition, the matrix resin can exhibit a sufficient pressure-sensitive adhesion property which allows the luminescent composition to adhere to a given member only by applying a pressing force thereto at an ordinary temperature.

The glass transition temperature Tg as used herein means the value of an extrapolated glass transition initiation temperature which is measured in a temperature range of from −80 to 250° C. using a power compensation differential scanning calorimeter "Pyrisl DSC" available from Perkin Elmer Inc., according to JIS K 7121.

Examples of the suitable resin having such properties include polyester-based resins, polyurethane-based resins, silicone-based resins and acrylic resins. Among these resins, preferred are acrylic resins.

<Acrylic Resins>

The acrylic resins having a pressure-sensitive adhesion property are preferably in the form of a copolymer of a (meth) acrylic acid ester whose ester moiety is constituted of an alkyl group having 1 to 20 carbon atoms with a monomer having a functional group such as a carboxyl group and the other monomer in which the monomers may be optionally used according to requirements, i.e., a (meth)acrylic acid ester copolymer. Examples of the (meth)acrylic acid ester whose ester moiety is constituted of an alkyl group having 1 to 20 carbon atoms include methyl (meth)acrylate, ethyl (meth)acrylate, propyl (meth)acrylate, butyl (meth)acrylate, pentyl (meth)acrylate, hexyl (meth)acrylate, cyclohexyl (meth)acrylate, 2-ethylhexyl (meth)acrylate, isooctyl (meth)acrylate, decyl (meth)acrylate, dodecyl (meth)acrylate, myristyl (meth)acrylate, palmityl (meth)acrylate and stearyl (meth) acrylate. These (meth)acrylic acid esters may be used alone or in combination of any two or more thereof.

Examples of the monomer having a functional group which may be optionally used according to requirements include ethylenically unsaturated carboxylic acids such as acrylic acid, methacrylic acid, crotonic acid, maleic acid, itaconic acid and citraconic acid; (meth)acrylic acid hydroxyalkyl esters such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth) acrylate and 4-hydroxybutyl (meth)acrylate; and monoalkylaminoalkyl (meth)acrylates such as monomethylaminoethyl (meth)acrylate, monoethylaminoethyl (meth) acrylate, monomethylaminopropyl (meth)acrylate and monoethylaminopropyl (meth)acrylate. These monomers may be used alone or in combination of any two or more thereof.

Examples of the other monomer which may also be optionally used according to requirements include vinyl esters such as vinyl acetate and vinyl propionate; olefins such as ethylene, propylene and isobutylene; halogenated olefins such as vinyl chloride and vinylidene chloride; styrene-based monomers such as styrene and α-methyl styrene; diene-based monomers such as butadiene, isoprene and chloroprene; nitrile-based monomers such as acrylonitrile and methacrylonitrile; and acrylamides such as acrylamide, N-methyl acrylamide and N,N-dimethyl acrylamide. These other monomers may be used alone or in combination of any two or more thereof.

In the present invention, to obtain the above acrylic resin used as the matrix resin, the (meth)acrylic acid ester as a main component may be suitably polymerized with at least one monomer appropriately selected from the above monomers having a functional group and the above other monomers such that the resulting acrylic resin has a glass transition temperature Tg of from −70 to 5° C. The type of the resulting copolymer is not particularly limited, and may be any of a random copolymer, a block copolymer and a graft copolymer. The weight-average molecular weight of the acrylic resin is preferably 300,000 or more, and more preferably from 400,000 to 2,000,000. When the weight-average molecular weight of the acrylic resin lies within the above-specified range, it is possible to effectively suppress squeeze out of the resin. Meanwhile, the weight-average molecular weight is the value as measured in terms of a polystyrene by gel permeation chromatography (GPC).

In order to allow the above acrylic resin to maintain a good pressure-sensitive adhesion property at an ordinary temperature and suppress squeeze-out of the acrylic resin when bonding the inorganic electroluminescent layer to the other layers, an active hydrogen-containing functional group in the acrylic resin (such as, for example, a hydroxyl group and a carboxyl group) may be reacted with a crosslinking agent. Examples of the crosslinking agent include polyisocyanate compounds, epoxy resins, melamine resins, urea resins, dialdehydes, methylol polymers, aziridine-based compounds and metal chelate compounds.

Alternatively, the acrylic resin may be copolymerized with an internal crosslinking agent such as a polyfunctional acrylate-based monomer upon the polymerization. Examples of the polyfunctional acrylate-based monomer include 1,4-butanediol di(meth)acrylate, 1,6-hexanediol di(meth)acrylate, neopentyl glycol di(meth)acrylate, polyethylene glycol di(meth)acrylate, polypropylene glycol di(meth)acrylate, pentaerythritol di(meth)acrylate and hexanediol di(meth) acrylate.

In the present invention, these matrix resins may be used alone or in combination of any two or more thereof.

(Thermoplastic Resin)

The thermoplastic resin having a softening point of from 30 to 270° C. is suitably incorporated in the luminescent composition of the present invention when the luminescent composition is used in the form of a sheet-like light-emitting member. The thermoplastic resin used in the luminescent composition is not particularly limited as long as it can exhibit a good thermoplasticity. The softening point of the thermoplastic resin is preferably in the range of from 30 to 270° C., more preferably from 32 to 250° C. and still more preferably from 80 to 240° C. When the softening point of the thermoplastic resin lies within the above-specified range, the inorganic electroluminescent substance has a good dispersibility therein, so that bonding between the below-mentioned inorganic electroluminescent layer and the other layers can be readily accomplished by heating.

The softening point of the thermoplastic resin is the value measured according to JIS K 6863.

Examples of the thermoplastic resin include polyesters such as polyethylene terephthalate and polybutylene terephthalate; polyester-based thermoplastic elastomers; various thermoplastic elastomers modified by epoxidation, etc.; poly (vinyl chloride); ethylene-vinyl acetate copolymer resins; acrylic resins; acryl-urethane copolymers; acryl-urethane graft copolymers; ethylene-(meth)acrylic acid copolymer resins; polyolefins such as polypropylene; and polyolefin-based thermoplastic elastomers. Among these thermoplastic resins, preferred are ethylene-vinyl acetate copolymers and ethylene-(meth)acrylic acid copolymers.

These thermoplastic resins may be used alone or in combination of any two or more thereof.

<<Inorganic Electroluminescent Substance>>

The inorganic electroluminescent material used in the present invention is not particularly limited, and may be any optional material appropriately selected from conventionally known inorganic electroluminescent materials. Examples of the suitable inorganic electroluminescent material include ZnS:Cu, ZnS:Mn, ZnS:TbF$_3$, ZnS:SmF$_3$ and ZnS:TmF$_3$ which are obtained by adding each of copper, manganese, terbium fluoride, samarium fluoride and thulium fluoride as a luminescent center material to zinc sulfide (ZnS) as a base material; CaS:Eu which is obtained by adding europium as a luminescent center material to calcium sulfide (CaS) as a base material; SrS:Ce which is obtained by adding cerium as a luminescent center material to strontium sulfide (SrS) as a base material; and those inorganic materials which are respectively obtained by adding a transition metal such as manganese or a rare earth element such as europium, cerium and terbium as a luminescent center material to an alkali earth element calcium sulfide such as CaCa$_2$S$_4$ and SrCa2S$_4$ as a base material.

Among these inorganic electroluminescent materials, preferred are ZnS:Cu and ZnS:TbF$_3$ as a green light-emitting material, ZnS:Mn as a yellowish orange light-emitting material, ZnS:SmF$_3$ and CaS:Eu as a red light-emitting material, and ZnS:TmF$_3$ and SrS:Ce as as a blue light-emitting material.

Further examples of the inorganic electroluminescent material include oxide luminescent materials composed of Sc$_2$O$_3$ which is doped with a rare earth element other than Sc such as, for example, Y, La, Ce, Pr, Nd, Sm, Eu, Gd, Tb, Dy, Ho, Er, Tm, Yb and Lu. Among the above rare earth elements to be doped, Ce, Sm, Eu, Tb and Tm are preferably used. These inorganic electroluminescent materials is capable of emitting a yellow light, a red light having a longer wavelength than that of the yellow light, or a green or blue light having a shorter wavelength than that of the yellow light, depending upon the kind of rare earth element to be doped.

In the present invention, these inorganic electroluminescent materials may be used alone or in combination of any two or more thereof, if required.

In the luminescent composition of the present invention, when the inorganic electroluminescent substance used therein is in the form of particles, from the viewpoint of uniform dispersibility in the binder resin, the particles preferably have an average particle size of from 1 to 100 μm, more preferably from 10 to 60 μcm, and still more preferably from 20 to 50 μm.

The content of the inorganic electroluminescent substance in the luminescent composition of the present invention is required to lie within the range of not less than 0.5 part by mass and less than 100 parts by mass on the basis of 100 parts by mass of the binder resin from the viewpoints of good balance between luminescence, pressure-sensitive adhesion property and economy as well as a good light transmittance (transparency) of the obtained inorganic electroluminescent sheet. The content of the inorganic electroluminescent substance in the luminescent composition is preferably not less than 0.5 part by mass and less than 40 parts by mass, more preferably not less than 1 part by mass and less than 20 parts by mass, and still more preferably not less than 1 part by mass and less than 10 parts by mass.

(Precipitation Inhibitor)

The luminescent composition of the present invention preferably contains a precipitation inhibitor in order to prevent precipitation of the electroluminescent substance and enhance a dispersibility of the electroluminescent substance in the below-mentioned inorganic electroluminescent layer. Examples of the precipitation inhibitor include polyethylene oxide-based compounds, hydrogenated castor oils and higher fatty acid amides. Specific examples of the preferred precipitation inhibitor include higher fatty acid amides such as oleamide, stearamide, capronic amide, linoleic amide, N,N'-methylene-bis(stearamide) and N,N'-ethylene-bis(stearamide).

The content of the precipitation inhibitor in the luminescent composition is usually from about 0.1 to about 5 parts by mass and preferably from 0.2 to 4 parts by mass in terms of a solid content thereof on the basis of 100 parts by mass of the binder resin from the viewpoint of good balance between precipitation-inhibiting effect and economy. These precipitation inhibitors may be used alone or in combination of any two or more thereof.

<<Luminescent Color Modifier>>

The luminescent composition of the present invention preferably contains a luminescent color modifier for the purpose of controlling a luminescent color to be emitted therefrom. The luminescent color modifier is preferably at least one material selected from the group consisting of a fluorescent substance and a pigment.

(Fluorescent Substance)

The fluorescent substance used in the luminescent composition of the present invention may be appropriately selected from conventionally known fluorescent substances in view of the luminescent color to be emitted therefrom.

Examples of a suitable fluorescent coloring matter which is capable of absorbing a light of from blue to bluish green-color range emitted from the luminescent substance and generating a fluorescence of a green-color range, include coumarin-based coloring matter such as 2,3,5.6-1H,4H-tetrahydro-8-trifluoromethyl quinolizine (9,9a,1-gh)coumarin (coumarin 153), 3-(2'-benzothiazolyl)-7-diethylaminocoumarin (coumarin 6), 3-(2'-benzimidazolyl)-7-N,N-diethylaminocoumarin (coumarin 7) and 3-(2'N-methylbenzimidazolyl)-7-N,N-diethylaminocoumarin (coumarin 30); and naphthalimide-based coloring matter such as Solvent Yellow 11 and Solvent Yellow 116.

Examples of a suitable fluorescent coloring matter which is capable of absorbing a light of from blue to bluish green-color range emitted from the luminescent substance and generating a fluorescence of a red-color range, include cyanine-based coloring matter s such as 4-dicyanomethylene-2-methyl-6-(p-dimethylaminostyryl)-4H-pyran (DCM); pyridine-based coloring matter such as 1-ethyl-2-[4-(p-dimethylaminophenyl)-1,3-butadienyl)-pyridinium-perchlorate (pyridine 1); rhodamine-based coloring matter such as rhodamine B, rhodamine 6G, rhodamine 3B, rhodamine 101, rhodamine 110, sulfo-rhodamine, Basic Violet 11 and Basic Red 2; and oxazoline-based coloring matter. In addition, the fluorescent coloring matter may also be used in the form of a fluorescent pigment which is obtained by previously kneading the fluorescent coloring matter in a poly(methacrylic acid ester), polyvinyl chloride, a vinyl chloride-vinyl acetate copolymer resin, an alkyd resin, an aromatic sulfone amide resin, a urea resin, a melamine resin, a benzoguanamine resin or a resin mixture of these resins.

The content of the fluorescent substance in the luminescent composition is preferably from 1 to 50 parts by mass and more preferably from 3 to 20 parts by mass on the basis of 100 parts by mass of the inorganic electroluminescent substance used therein from the viewpoint of a good transparency when no electric voltage applied thereto. These fluorescent coloring matter or fluorescent pigments may be used alone or in combination of any two or more thereof, if required.

(Pigment)

The pigment used in the luminescent composition of the present invention may be appropriately selected from conventionally known pigments according to the luminescent color to be emitted therefrom. Examples of the suitable pigment include inorganic pigments such as titanium white, zinc white, rouge, vermilion, ultramarine blue, cobalt blue, titan yellow and chrome yellow; and organic pigments such as isoindolinone, Hansa yellow A, quinacridone, Permanent Red 4R, phthalocyanine blue and indanthrene blue RS.

The content of the pigment in the luminescent composition is preferably from 1 to 50 parts by mass and more preferably from 3 to 20 parts by mass on the basis of 100 parts by mass of the inorganic electroluminescent substance used therein from the viewpoint of a good transparency when no electric voltage applied thereto.

<<Ultraviolet Absorber and Infrared Absorber>>

The luminescent composition of the present invention preferably contains at least one material selected from the group consisting of an ultraviolet absorber and an infrared absorber for the purpose of enhancing a weather resistance of the luminescent composition.

(Ultraviolet Absorber)

The ultraviolet absorber used in the luminescent composition of the present invention may be appropriately selected from conventionally known ultraviolet absorbers. Examples of the suitable ultraviolet absorber include 2'-hydroxyphenyl-5-chlorobenzotriazole-based ultraviolet absorbers such as 2-(2'-hydroxy-3',5'-di-tert-butylphenyl)-5-chlorobenzotriazole, 2-(2'-hydroxy-3'-text-butyl-5'-methylphenyl)-5-chlorobenzotriazole, 2-(2'-hydroxy-3'-tert-amyl-5'-isobutylphenyl)-5-chlorobenzotriazole, 2-(2'-hydroxy-3'-isobutyl-5'-methylphenyl)-5-chlorobenzotriazole and 2-(2'-hydroxy-3'-isobutyl-5'-propylphenyl)-5-chlorobenzotriazole; 2'-hydroxyphenyl benzotriazole-based ultraviolet absorbers such as 2-(2'-hydroxy-3',5'-di-tert-butylphenyl)benzotriazole and 2-(2'-hydroxy-5'-methylphenyl)benzotriazole; 2,2'-dihydroxybenzophenone-based ultraviolet absorbers such as 2,2'-dihydroxy-4-methoxybenzophenone, 2,2'-dihydroxy-4,4'-dimethoxybenzophenone and 2,2',4,4'-tetrahydroxybenzophenone; 2-hydroxybenzophenone-based ultraviolet absorbers such as 2-hydroxy-4-methoxybenzophenone and 2,4-dihydroxybenzophenone; salicylic acid ester-based ultraviolet absorbers such as phenyl salicylate and 4-tert-butyl phenyl salicylate; cyanoacrylate-based ultraviolet absorbers such as 2-ethyl-hexyl-2-cyano-3,3-diphenyl acrylate, ethyl-2-cyano-3,3-diphenyl acrylate and octyl-2-cyano-3,3-diphenyl acrylate; and triazine-based ultraviolet absorbers such as 2-(4,6-bis(2,4-dimethylphenyl)-1,3,5-triazin-2-yl)-5-hydroxyphenyl, 2-(2,4-dihydroxyphenyl)-4,6-bis-(2,4-dimethylphenyl)-1,3,5-triazine, 2,4-bis[2-hydroxy-4-butoxyphenyl]-6-(2,4-dibutoxyphenyl)-1,3,5-triazine and tris(hydroxyphenyl)triazine, as well as reactive ultraviolet absorbers obtained by introducing an acryloyl group or a methacryloyl group into a benzotriazole skeleton.

The content of the ultraviolet absorber in the luminescent composition is preferably from 0.5 to 20 parts by mass and more preferably from 1 to 10 parts by mass on the basis of 100 parts by mass of the binder resin.

(Infrared Absorber)

The infrared absorber used in the luminescent composition of the present invention may be appropriately selected from conventionally known infrared absorbers such as organic infrared absorbers and inorganic infrared absorbers.

Examples of the organic infrared absorber include phthalocyanine, naphthalocyanine, anthraquinone, cyanine compounds, squarylium compounds, thiol-nickel complex compounds, triaryl methanes, naphthoquinone, anthraquinone, and amine compounds such as N,N,N',N'-tetrakis(p-di-n-butylaminophenyl)-p-phenylenediaminium perchlorate, phenylenediaminium chlorate, phenylenediaminium hexafluoroantimonate, phenylenediaminium fluoroborate and phenylenediaminium fluorate.

Examples of the suitable inorganic infrared absorber include oxides, nitrides, carbides, oxynitrides and sulfides of metals such as Sn, Ti, Si, Zn, Zr, Fe, Al, Cr, Co, Ce, In, Ni, Ag, Cu, Pt, Nn, Ta, W, V and Mo. Among these inorganic compounds, preferred are metal oxides such as ITO (indium tin oxide), ATO (antimony tin oxide), $SnO_2$, $TiO_2$, $SiO_2$, $ZrO_2$, ZnO, $Fe_2O_3$, $Al_2O_3$, FeO, $Cr_2O_3$, $Co_2O_3$, $CeO_2$, $In_2O_3$, NiO, MnO, CuO and $WO_3$. The metal oxides may contain an additive such as cesium (Cs) for the purpose of enhancing an infrared absorption performance thereof.

The content of the infrared absorber in the luminescent composition is preferably from 0.5 to 20 parts by mass and more preferably from 1 to 10 parts by mass on the basis of 100 parts by mass of the binder resin.

Further, the luminescent composition of the present invention may also contain, if required, various additives other than those described above, for example, an antioxidant, a light stabilizer, a tackifies, etc., unless addition of these additives adversely affects the aimed effects of the present invention.

(Preparation of Luminescent Composition)

The method for preparing the luminescent composition of the present invention is not particularly limited as long as the above inorganic electroluminescent substance can be uniformly dispersed or dissolved, if required, together with the precipitation inhibitor, the fluorescent substance, the pigment, the ultraviolet absorber and the infrared absorber as well as various other additives as optional components, in the binder resin.

[Inorganic Electroluminescent Sheet]

Next, the inorganic electroluminescent sheet according to the present invention is described.

The inorganic electroluminescent sheet according to the present invention includes at least a first transparent substrate, a first transparent electrode, an inorganic electroluminescent layer, a second transparent electrode and a second transparent substrate which are successively laminated in this order. The inorganic electroluminescent layer is formed from the luminescent composition of the present invention as described above, and the inorganic electroluminescent sheet exhibits a light transmittance of 60% or more as measured at a wavelength of 550 nm under a non-light emitting condition. The light transmittance described herein is the value measured using an ultraviolet visible near-infrared spectrophotometer "UV-3101PC" available from Shimadzu Corporation.

<<First Transparent Substrate and Second Transparent Substrate>>

In the inorganic electroluminescent sheet of the present invention, the first transparent substrate forms a luminescent surface of the sheet, and the second transparent substrate forms a rear surface opposed to the luminescent surface. Each of the first transparent substrate and the second transparent substrate is preferably constituted of a plastic film having a light transmittance of 60% or more as measured at a wavelength of 550 nm. The light transmittance of each of the first transparent substrate and the second transparent substrate is preferably 70% or more, and more preferably 80% or more. Examples of the material of such a film include polyesters, polyolefins, cyclopolyolefins, and acrylic resins such as polymethyl methacrylate. Among these materials, polyesters and polyamides are preferably used from the viewpoints of good transparency, low costs and good flexibility. Examples of the polyesters include polyethylene terephthalate, polybutylene terephthalate, polyethylene naphthalate and polyarylates. Examples of the polyamides include all aromatic polyamides such as nylon 6, nylon 66 and nylon copolymers.

The thickness of the plastic film used as the respective substrates in the inorganic electroluminescent sheet is not particularly limited, and is usually from 1 to 1000 μm and preferably from 5 to 500 μm, and further is more preferably from 50 to 200 μm in view of practicability upon use.

The first transparent substrate and the second transparent substrate may have either a colorless transparency or a colored transparency. However, the first transparent substrate and the second transparent substrate are preferably colorless transparent from the viewpoint of preventing scattering or attenuation of light emitted from the below-mentioned inorganic electroluminescent layer.

Also, the first transparent substrate and the second transparent substrate may be respectively provided on its front or rear surface with a moisture permeation-preventing layer (gas barrier layer), if required. As the material of the moisture permeation-preventing layer (gas barrier layer), there may be suitably used inorganic materials such as silicon nitride and silicon oxide. The moisture permeation-preventing layer (gas barrier layer) may be formed, for example, by a high-frequency sputtering method, etc.

<<First Transparent Electrode>>

The first transparent electrode (anode) used in the inorganic electroluminescent sheet of the present invention is not particularly limited as long as it has a suitable function as the anode and is formed of a transparent electrode, and may be appropriately selected from conventionally known anodes depending upon the aimed applications of the inorganic electroluminescent sheet. Examples of the suitable material of the first transparent electrode include metals, alloys, metal oxides, organic conductive compounds and mixtures thereof. Among these materials, preferred are those materials having a work function of 4.0 eV or more. Specific examples of the materials having a work function of 4.0 eV or more include metal oxides such as doped tin oxide which is doped with antimony or fluorine (such as ATO and FTO), tin oxide, zinc oxide, indium oxide, indium tin oxide (ITO) and indium zinc oxide (IZO); metals such as gold, silver, chromium and nickel, as well as mixtures or laminates of these metals and conductive metal oxides; inorganic conductive substances such as copper iodide and copper sulfide; and organic conductive materials such as polyaniline, polythiophene and polypyrrole, as well as laminates of these organic materials and ITO. The first transparent electrode is especially preferably formed of the metal oxides, in particular, ITO.

The first transparent electrode may be formed on the first transparent substrate by any suitable method which is appropriately selected from, for example, wet methods such as a printing method and a coating method, physical methods such as a vacuum deposition method, a sputtering method and an ion-plating method and chemical methods such as CVD and plasma CVD, in view of suitability and compatibility with the above material used for the electrode. For example, in the case where ITO is selected and used as the material of the first transparent electrode, the first transparent electrode may be formed by a DC or high-frequency sputtering method, a vacuum deposition method, an ion-plating method, etc. On the other hand, in the case where the organic conductive compound is selected and used as the material of the first transparent electrode, the first transparent electrode may be formed by a wet film-forming method.

The thickness of the first transparent electrode may be appropriately determined according to the material thereof and is therefore not particularly limited, and is usually from 10 to 1000 nm, preferably from 20 to 500 nm and more preferably from 50 to 200 nm.

The resistance value of the first transparent electrode is preferably $10^3 \Omega/\square$ or less and more preferably $10^2 \Omega/\square$ or less.

The first transparent electrode may have either a colorless transparency or a colored transparency, and is preferably colorless transparent. In order to allow emission of light from a side of the first transparent electrode, a laminate composed of the first transparent substrate and the first transparent electrode is required to have a light transmittance of 60% or more as measured at a wavelength of 550 nm. The light transmittance of the laminate is more preferably 70% or more. The light transmittance may be measured by known methods using a spectrophotometer.

<<Second Transparent Electrode>>

The second transparent electrode (cathode) used in the inorganic electroluminescent sheet of the present invention is not particularly limited as long as it has a suitable function as the cathode and is in the form of a transparent electrode, and may be appropriately selected from known cathodes according to the aimed applications of the inorganic electroluminescent sheet. Examples of the suitable material of the second transparent electrode are those used for the above first transparent electrode.

The method for forming the second transparent electrode is not particularly limited, and the second transparent electrode may be formed by known methods. The second transparent electrode may be formed in the same manner as used for forming the first transparent electrode.

The thickness of the second transparent electrode may be appropriately determined according to the material thereof and therefore is not particularly limited, and is usually from 10 to 1000 nm, preferably from 20 to 500 nm and more preferably from 50 to 200 nm.

<<Inorganic Electroluminescent Layer>>

The inorganic electroluminescent layer provided in the inorganic electroluminescent sheet of the present invention is formed from the above luminescent composition. More specifically, the inorganic electroluminescent layer may be formed by coating the first or second transparent electrode or the below-mentioned dielectric layer with the above luminescent composition or by laminating the sheet-like luminescent member on the first or second transparent electrode or on the dielectric layer. The method for forming the inorganic electroluminescent layer may be appropriately selected according to kind of binder resin used in the luminescent composition, a desired thickness of the inorganic electroluminescent layer, etc. When the binder resin used in the luminescent composition is the matrix resin, it is preferred that a solvent be added to the luminescent composition to prepare a coating solution to be applied. Examples of the solvent include toluene, xylene, ethyl acetate, methanol and methyl ethyl ketone. Also, when the binder resin is the thermoplastic resin, the inorganic electroluminescent layer is preferably formed by laminating the sheet-like luminescent member while heating (heat lamination).

In the case where the inorganic electroluminescent layer is formed by coating with the luminescent composition, the coating method of the luminescent composition is not particularly limited, and there may be used conventionally known methods such as, for example, a knife coating method, a roll coating method, a bar coating method, a blade coating method, a die coating method and a gravure coating method.

The thickness of the thus obtained inorganic electroluminescent layer is usually from about 0.1 to about 100 μm, preferably from 5 to 90 μm and more preferably from 20 to 80 μm from the viewpoints of enhancing a light transmittance (transparency) of the layer and adhesion thereof to other layers and suppressing squeeze-out thereof from the sheet.

In the case where the inorganic electroluminescent layer is formed by the sheet-like luminescent member, the method of preparing the sheet-like luminescent member is not particularly limited. For example, the binder resin, the inorganic electroluminescent substance and the other additives are mixed and kneaded at predetermined ratios using a kneader, and then extruded into a sheet shape through a die of an extruder to obtain the sheet-like luminescent member used as the inorganic electroluminescent layer. In this case, when it is intended to laminate a sheet-like luminescent composition on a given member, the composition is extruded into a sheet shape from the above extruder onto the member to be laminated.

As the kneader, there may be used conventionally known devices such as a ribbon blender, a Henschel mixer, a Banbury mixer, a drum tumbler, a single-screw extruder, a twin-screw extruder, a co-kneader, a multi-screw extruder, etc. The kneading temperature is higher by usually from about 70 to about 110° C., preferably from 80 to 100° C., than a softening point of the thermoplastic resin used. Meanwhile, when the above components are kneaded together, various other additives such as antioxidants and light stabilizers may be added thereto, if required, unless the addition thereof adversely affects the aimed effects of the present invention.

The kneaded material obtained from the kneader is usually pelletized, and then extruded into a sheet shape through a die using an extruder, etc., to obtain the sheet-like luminescent member. The die temperature when extruding the thermoplastic resin therethrough is higher by usually from about 30 to about 120° C., preferably from 70 to 90° C., than a softening point of the thermoplastic resin.

The thickness of the thus obtained sheet-like luminescent member is preferably from 10 to 1000 μm, more preferably from 20 to 500 μm and still more preferably from 30 to 100 μm from the viewpoints of light emission property (luminance), light transmittance (transparency) and practicability upon use.

The breaking strength of the sheet-like luminescent member is preferably from 1 to 100 MPa. When the breaking strength of the sheet-like luminescent member lies within the above-specified range, the member is hardly broken even upon applying a tension thereto, so that the inorganic electroluminescent sheet can be produced in an efficient manner.

The luminescent composition of the present invention is suitably used for forming the inorganic electroluminescent layer in the below-mentioned inorganic electroluminescent sheet by coating with the composition or by forming the composition into the sheet-like luminescent member. Thus, by using the sheet-like luminescent member as the above inorganic electroluminescent layer, the inorganic electroluminescent sheet can be produced with a high productivity at low cost in an efficient manner, which also enables mass-production of the sheet.

(Dielectric Layer)

In the inorganic electroluminescent sheet of the present invention, in order to enhance a luminous efficiency thereof, a dielectric layer containing a dielectric material is preferably provided in either between the first transparent electrode and the inorganic electroluminescent layer or between the inorganic electroluminescent layer and the second transparent electrode, or in both the positions.

Examples of the dielectric material include inorganic materials such as $SiO_2$, $BaTiO_3$, $SiON$, $Al_2O_3$, $TiO_2$, $Si_3N_4$, $SiAlON$, $Y_2O_3$, $Sm_2O_3$, $Ta_2O_5$, $BaTa_2O_3$, $PbNb_2O_3$, $Sr(Zr,Ti)O_3$, $SrTiO_3$, $PbTiO_3$ and $HfO_3$; and organic materials such as polyethylene, polypropylene, polystyrene, silicone resins, epoxy resins, vinylidene fluoride, acrylic resins and cyanoacetyl cellulose-based resins. The dielectric layer is preferably transparent in order to impart an excellent transparency to the inorganic electroluminescent sheet of the present invention. Therefore, among the above dielectric materials, preferred are inorganic materials such as $SiO_2$, $Al_2O_3$, $Si_3N_4$, $Y_2O_3$, $Ta_2O_5$, $BaTa_2O_3$, $SrTiO_3$ and $PbTiO_3$. These dielectric materials may be used alone or in combination of any two or more thereof. In addition to the above inorganic materials, the organic materials such as curable resins and thermoplastic resins as single materials are also preferably used as the dielectric material.

The dielectric layer may be formed, for example, by applying a dielectric material composition prepared by uniformly dispersing the above dielectric material in an adequate binder resin according the requirements by conventionally known coating methods such as, for example, a spray coating method, a knife coating method, a roll coating method, a bar coating method, a blade coating method, a die coating method and a gravure coating method or by using an extruder. Meanwhile, the dielectric material made of an organic material may be directly applied as such without using any binder resin to form the dielectric layer.

The binder resin used in the dielectric layer is not particularly limited. However, depending upon the position where the dielectric layer is provided, a pressure-sensitive adhesive resin is preferably used as the binder resin in view of convenience and simplicity upon production of the inorganic electroluminescent sheet. Examples of the preferred pressure-sensitive adhesive resin include the above matrix resins.

From the same viewpoints, the binder resin used in the dielectric layer is advantageously a resin having a heat laminating property. Examples of the preferred heat-laminating resin include thermoplastic resins.

The dielectric layer can exhibit, in addition to the above effect of improving a luminescent efficiency, the following controlling effect. That is, upon operating the inorganic electroluminescent sheet of the present invention by supplying an alternating current thereto, in the case where a sufficient electric voltage is hardly applied to the inorganic electroluminescent layer owing to an excessively high electric conductivity of the inorganic electroluminescent layer or in the case where dielectric breakdown thereof tends to occur owing to overcurrent, the dielectric layer exhibits the controlling effect for suppressing occurrence of these defects. The thickness of the dielectric layer is usually from about 0.1 to about 100 μm and preferably from 10 to 50 μm from the viewpoint of allowing the dielectric layer to exhibit the above controlling effect.

[Process for Producing Inorganic Electroluminescent Sheet]

Next, the process for producing the inorganic electroluminescent sheet according to the present invention is described.

The production process of the present invention is characterized in that a first laminate and a second laminate are prepared by the following step (1) or (2), and then a side of the inorganic electroluminescent layer of the first laminate is bonded to a side of the second transparent electrode of the second laminate, or a side of the first transparent electrode of the first laminate is bonded to a side of the inorganic electroluminescent layer of the second laminate:

Step (1): laminate preparing step including successively forming at least the first transparent electrode and the inorganic electroluminescent layer on the first transparent substrate to prepare the first laminate, and separately forming at least the second transparent electrode on the second transparent substrate to prepare the second laminate;

Step (2): laminating forming step including forming at least the first transparent electrode on the first transparent substrate to prepare the first laminate, and separately successively forming at least the second transparent electrode and the inorganic electroluminescent layer on the second substrate to prepare the second laminate.

In the production process of the present invention, the construction of each of the first laminate and the second laminate is illustrated by the following symbols.

That is, the first transparent substrate, the second transparent substrate, the first transparent electrode, the second transparent electrode and the inorganic electroluminescent layer are represented by "1", "2", "$E^1$", "$E^2$" and "L", respectively. In addition, the dielectric layer is represented by "D".

In the method using the above step (1), the obtained first laminate has a construction of 1-$E^1$-L, and the obtained second laminate has a construction of 2-$E^2$. The first laminate and the second laminate thus constructed are faced each other such that L is opposed to $E^2$, and then pressed and bonded together to obtain an inorganic electroluminescent sheet (a) having a construction of 1-$E^1$-L-$E^2$-2.

Also, in the method using the above step (2), the obtained first laminate has a construction of 1-$E^1$, and the obtained second laminate has a construction of 2-$E^2$-L. The first laminate and the second laminate thus constructed are faced each other such that $E^1$ is opposed to L, and then pressed and bonded together to obtain an inorganic electroluminescent sheet (a) having a construction of 1-$E^1$-L-$E^2$-2.

In FIG. 1, there is shown a schematic sectional view of the construction of the thus obtained inorganic electroluminescent sheet (a). Also, the constructions of the first laminate, the second laminate and the resulting inorganic electroluminescent sheet when using each of the steps (1) and (2) are shown in Table 1.

When the resulting inorganic electroluminescent sheet has a dielectric layer or dielectric layers, the production process of the present invention includes any one of the following laminate preparing steps (3) to (12). Specifically, in such a case, the inorganic electroluminescent sheet is produced by first preparing the first laminate and the second laminate by any one of the laminate preparing steps; and then bonding a side of the dielectric layer, the inorganic electroluminescent layer or the first transparent electrode of the first laminate to a side of the second transparent electrode, the inorganic electroluminescent layer or the dielectric layer of the second laminate. The thus produced inorganic electroluminescent sheet has a construction including the dielectric layer or dielectric layers.

Step (3): laminating forming step including successively forming at least the first transparent electrode, the dielectric layer and the inorganic electroluminescent layer on the first transparent substrate to prepare the first laminate, and separately forming at least the second transparent electrode on the second transparent substrate to prepare the second laminate;

Step (4): laminate preparing step including successively forming at least the first transparent electrode and the dielectric layer on the first transparent substrate to prepare the first laminate, and separately successively forming at least the second transparent electrode and the inorganic electroluminescent layer on the second transparent substrate to prepare the second laminate;

Step (5): laminate preparing step including forming at least the first transparent electrode on the first transparent substrate to prepare the first laminate, and separately successively forming at least the second transparent electrode, the inorganic electroluminescent layer and the dielectric layer on the second transparent substrate to prepare the second laminate;

Step (6): laminate preparing step including successively forming at least the first transparent electrode, the inorganic electroluminescent layer and the dielectric layer on the first transparent substrate to prepare the first laminate, and separately forming at least the second transparent electrode on the second transparent substrate to prepare the second laminate;

Step (7): laminate preparing step including successively forming at least the first transparent electrode and the inorganic electroluminescent layer on the first transparent substrate to prepare the first laminate, and separately successively forming at least the second transparent electrode and the dielectric layer on the second transparent substrate to prepare the second laminate;

Step (8): laminate preparing step including forming at least the first transparent electrode on the first transparent substrate to prepare the first laminate, and separately successively forming at least the second transparent electrode, the dielectric layer and the inorganic electroluminescent layer on the second transparent substrate to prepare the second laminate;

Step (9): laminate preparing step including successively forming at least the first transparent electrode, the dielectric layer, the inorganic electroluminescent layer and the dielectric layer on the first transparent substrate to prepare the first laminate, and separately forming at least the second transparent electrode on the second transparent substrate to prepare the second laminate;

Step (10): laminate preparing step including successively forming at least the first transparent electrode, the dielectric layer and the inorganic electroluminescent layer on the first transparent substrate to prepare the first laminate, and separately successively forming at least the second transparent electrode and the dielectric layer on the second transparent substrate to prepare the second laminate;

Step (11): laminate preparing step including successively forming at least the first transparent electrode and the dielectric layer on the first transparent substrate to prepare the first laminate, and separately successively forming at least the second transparent electrode, the dielectric layer and the inorganic electroluminescent layer on the second transparent substrate to prepare the second laminate; and Step (12); laminate preparing step including forming at least the first transparent electrode on the first transparent substrate to prepare the first laminate, and separately successively forming at least the second transparent electrode, the dielectric layer, the inorganic electroluminescent layer and the dielectric layer on the second transparent substrate to prepare the second laminate, wherein the dielectric layers formed on sides of the first transparent electrode and the second transparent electrode in the steps (9) to (12) may be the same or different from each other.

In the method using the above step (3), the obtained first laminate has a construction of 1-$E^1$-D-4 and the obtained second laminate has a construction of 2-$E^2$. The first laminate and the second laminate thus constructed are faced each other such that L is opposed to $E^2$, and then pressed or heat-laminated, and thereby bonded together to obtain an inorganic electroluminescent sheet (b) having a construction of 1-$E^1$-D-L-$E^2$-2.

In the method using the above step (4), the obtained first laminate has a construction of 1-$E^1$-D, and the obtained second laminate has a construction of 2-$E^2$-L. The first laminate and the second laminate thus constructed are faced each other such that D is opposed to L, and then pressed or heat-laminated, and thereby bonded together to obtain the inorganic electroluminescent sheet (b) having a construction of 1-$E^1$-D-L-$E^2$-2.

In the method using the above step (5), the obtained first laminate has a construction of 1-$E^1$, and the obtained second laminate has a construction of 2-$E^2$-L-D. The first laminate and the second laminate thus constructed are faced each other such that $E^1$ is opposed to D, and then pressed or heat-laminated, and thereby bonded together to obtain the inorganic electroluminescent sheet (b) having a construction of $1-E^1-D-L-E^2-2$. In this case, the dielectric layer D is bonded to the first transparent electrode $E^1$, and therefore preferably has a pressure-sensitive adhesion property or a heat-laminating property.

In the method using the above step (6), the obtained first laminate has a construction of $1-E^1-L-D$, and the obtained second laminate has a construction of $2-E^2$. The first laminate and the second laminate thus constructed are faced each other such that D is opposed to $E^2$, and then pressed or heat-laminated, and thereby bonded together to obtain an inorganic electroluminescent sheet (c) having a construction of $1-E^1-L-D-E^2-2$. In this case, the dielectric layer D is bonded to the second transparent electrode, and therefore preferably has a pressure-sensitive adhesion property or a heat-laminating property.

In the method using the above step (7), the obtained first laminate has a construction of $1-E^1-L$, and the obtained second laminate has a construction of $2-E^2-D$. The first laminate and the second laminate thus constructed are faced each other such that L is opposed to D, and then pressed or heat-laminated, and thereby bonded together to obtain the inorganic electroluminescent sheet (c) having a construction of $1-E^1-L-D-E^2-2$.

In the method using the above step (8), the obtained first laminate has a construction of $1-E^1$, and the obtained second laminate has a construction of $2-E^2-D-L$. The first laminate and the second laminate thus constructed are faced each other such that $E^1$ is opposed to L, and then pressed or heat-laminated, and thereby bonded together to obtain the inorganic electroluminescent sheet (c) having a construction of $1-E^1-L-D-E^2-2$.

In the method using the above step (9), the obtained first laminate has a construction of $1-E^1-D-L-D'$, and the obtained second laminate has a construction of $2-E^2$. The first laminate and the second laminate thus constructed are faced each other such that D' is opposed to $E^2$, and then pressed or heat-laminated, and thereby bonded together to obtain an inorganic electroluminescent sheet (d) having a construction of $1-E^1-D-L-D'-E^2-2$. In this case, the dielectric layer D and the dielectric layer D' may be the same or different from each other. In addition, the dielectric layer D' is bonded to the second transparent electrode $E^2$, and therefore preferably has a pressure-sensitive adhesion property or a heat-laminating property.

In the method using the above step (10), the obtained first laminate has a construction of $1-E^1-D-L$, and the obtained second laminate has a construction of $2-E^2-D'$. The first laminate and the second laminate thus constructed are faced each other such that L is opposed to D', and then pressed or heat-laminated, and thereby bonded together to obtain the inorganic electroluminescent sheet (d) having a construction of $1-E^1-D-L-D'E^2-2$. In this case, the dielectric layer D and the dielectric layer D' may be the same or different from each other.

In the method using the above step (11), the obtained first laminate has a construction of $1-E^1-D$, and the obtained second laminate has a construction of $2-E^2-D'-L$. The first laminate and the second laminate thus constructed are faced each other such that D is opposed to L, and then pressed or heat-laminated, and thereby bonded together to obtain the inorganic electroluminescent sheet (d) having a construction of $1-E^1-D-L-D'-E^2-2$. In this case, the dielectric layer D and the dielectric layer D' may be the same or different from each other.

In the method using the above step (12), the obtained first laminate has a construction of $1-E^1$, and the obtained second laminate has a construction of $2-E^2-D'-L-D$. The first laminate and the second laminate thus constructed are faced each other such that $E^1$ is opposed to D, and then pressed or heat-laminated, and thereby bonded together to obtain the inorganic electroluminescent sheet (d) having a construction of $1-E^1-D-L-D'-E^2-2$. In this case, the dielectric layer D and the dielectric layer D' may be the same or different from each other. In addition, the dielectric layer D is bonded to the first transparent electrode $E^1$, and therefore preferably has a pressure-sensitive adhesion property or a heat-laminating property.

In FIGS. 2, 3 and 4, there are respectively shown schematic sectional views of the constructions of the above inorganic electroluminescent sheets (b), (c) and (d) respectively having the dielectric layer or dielectric layers. In addition, the constructions of the first laminate, the second laminate and the resulting inorganic electroluminescent sheet when using each of the steps (3) to (12) are shown in Table 1.

TABLE 1

| Steps | First laminate Construction | Second laminate Construction | Electroluminescent sheet Construction | Kind |
|---|---|---|---|---|
| (1) | $1-E^1-L$ | $2-E^2$ | $1-E^1-L-E^2-2$ | (a) |
| (2) | $1-E^1$ | $2-E^2-L$ | $1-E^1-L-E^2-2$ | (a) |
| (3) | $1-E^1-D-L$ | $2-E^2$ | $1-E^1-D-L-E^2-2$ | (b) |
| (4) | $1-E^1-D$ | $2-E^2-L$ | $1-E^1-D-L-E^2-2$ | (b) |
| (5) | $1-E^1$ | $2-E^2-L-D$ | $1-E^1-D-L-E^2-2$ | (b) |
| (6) | $1-E^1-L-D$ | $2-E^2$ | $1-E^1-L-D-E^2-2$ | (c) |
| (7) | $1-E^1-L$ | $2-E^2-D$ | $1-E^1-L-D-E^2-2$ | (c) |
| (8) | $1-E^1$ | $2-E^2-D-L$ | $1-E^1-L-D-E^2-2$ | (c) |
| (9) | $1-E^1-D-L-D'$ | $2-E^2$ | $1-E^1-D-L-D'-E^2-2$ | (d) |
| (10) | $1-E^1-D-L$ | $2-E^2-D'$ | $1-E^1-D-L-D'-E^2-2$ | (d) |
| (11) | $1-E^1-D$ | $2-E^2-D'-L$ | $1-E^1-D-L-D'-E^2-2$ | (d) |
| (12) | $1-E^1$ | $2-E^2-D'-L-D$ | $1-E^1-D-L-D'-E^2-2$ | (d) |

The process for producing the inorganic electroluminescent sheet according to the present invention is not limited to the above embodiment in which the respective layers thereof are divided into two parts including the first laminate and the second laminate. In the present invention, it is also possible to produce the inorganic electroluminescent sheet by dividing the respective layers into 3 to 5 parts, in other words, by employing three or more laminates, according to the methods described in above-mentioned production process.

Further, in the case where the sheet-like luminescent member is used to form the inorganic electroluminescent layer, the inorganic electroluminescent sheet may be produced by forming at least the first transparent electrode on the first transparent substrate to prepare the first laminate, separately forming at least the second transparent electrode on the second transparent substrate to prepare the second laminate, and then bonding a side of the first transparent electrode of the first laminate to a side of the second transparent electrode of the second laminate through the sheet-like luminescent member used as the inorganic electroluminescent layer. In this case, the sheet-like luminescent member obtained by kneading the thermoplastic resin as the binder resin with the inorganic electroluminescent substance and then extruding the resulting kneaded material into a sheet shape using an extruder may be disposed between a side of the first transparent electrode of the first laminate and a side of the second transparent electrode of the second laminate, and then the resulting faced product may be passed between two heated rolls to heat-laminate and bond the respective layers together.

Alternatively, a kneaded material of the thermoplastic resin and the inorganic electroluminescent substance may be extruded between a side of the first transparent electrode of the first laminate and a side of the second transparent electrode of the second laminate using an extruder, followed by bonding both the laminates together through the extruded material.

In accordance with the above production process of the present invention, (i) by forming the inorganic electroluminescent layer from the luminescent composition having a pressure-sensitive adhesion property or a heat-laminating property, and further, if required, (ii) by allowing the dielectric layer to exhibit a pressure-sensitive adhesion property or a heat-laminating property, it is possible to produce the inorganic electroluminescent sheet having a desired construction with a good productivity in an extremely convenient manner. Therefore, the production process of the present invention having the above features is suitable for mass-production of the inorganic electroluminescent sheet.

The inorganic electroluminescent sheet of the present invention can be mass-produced by adopting the production process of the present invention, and can be suitably used, for example, as a back light for advertizing media and decorating media which are disposed on windows of commercial buildings or automobiles, or security sheets, etc. In addition, the inorganic electroluminescent sheet of the present invention can be especially suitably used as a member for protection of privacy which may be fitted to windows of vehicles, buildings, or houses, in view of an excellent light transmittance (transparency) thereof.

EXAMPLES

Next, the present invention is described in more detail by referring to the following Examples. However, these Examples are only illustrative and not intended to limit the invention thereto.
(Evaluation Methods)
<Measurement of Glass Transition Temperature Tg>
  The glass transition temperature Tg of the respective acrylic resins obtained in the following Examples and Comparative Examples was measured by the following method. That is, the glass transition temperature (Tg) of the acrylic resin was determined from an extrapolated glass transition initiation temperature which was measured in a temperature range of from −80 to 250° C. using a power compensation differential scanning calorimeter "Pyris1 DSG" available from Perkin Elmer Inc., according to JIS K 7121.
<Measurement of Softening Point>
  The softening point of the respective thermoplastic resins used in the following Examples and Comparative Examples was measured according to JIS K 6863.
<Measurement of Luminance>
  The luminance of light emitted from the inorganic electroluminescent sheet when operating the sheet under the conditions of 200 V and 2000 Hz was measured using a luminance meter "LS-100" available from Konica Minolta Corp.
<Measurement of Breaking Strength of Sheet-Like Luminescent Member>
  The breaking strength of the sheet-like luminescent member was measured at a testing speed of 200 m/min using a universal tensile tester (precision universal tester "Shimadzu Autograph AG-1 20 kN" available from Shimadzu Corporation) according to JIS K 7127.
<Measurement of Light Transmittance>
  The light transmittance of the inorganic electroluminescent sheet when irradiated with a light having a wavelength of 550 nm under a non-light emitting condition was measured using an ultraviolet visible near-infrared spectrophotometer ("UV-3101PC" available from Shimadzu Corporation).
<Measurement of Chromaticity Value (Measurement of Luminescent Color)>
  The chromaticity of light emitted from the inorganic electroluminescent sheet when operating the sheet under the conditions of 200 V and 2000 Hz was measured using a colorimetric luminance meter "CS-100A" available from Konica Minolta Corp. The obtained chromaticity values of light emitted (x, y) were analyzed by a chromaticity diagram (CIE 1931) to determine a luminescent color of the sheet. The luminescent color was evaluated according to the following ratings.
  Blue: x=0.05 to 0.25; and y=0.05 to 0.40
  White: x=0.25 to 0.35; and y=0.20 to 0.40
<Measurement of Haze>
  The haze value of the inorganic electroluminescent sheet under a non-light emitting condition was measured using a haze meter ("NDH-2000" available from Nippon Denshoku Co., Ltd.) according to JIS K 7136.

Production Example 1

Production of First Transparent Electrode with Substrate and Second Transparent Electrode with Substrate Using a winding type sputtering apparatus, an electric power of 1500 W was applied to an ITO target in an argon/oxygen atmosphere under a chamber inner pressure of $2.0 \times 10^{-1}$ Pa at a line speed of 0.2 m/min to form an ITO transparent conductive film having a thickness of 50 nm on a transparent polyethylene naphthalate (PEN) film having a width of 350 mm and a thickness of 100 μm ("Q65FA" available from Teijin DuPont Co., Ltd.), thereby obtaining a first transparent electrode with a substrate. Incidentally, a magnetron type sputtering apparatus "RS-0549" available from Rock Giken Kogyo Co., Ltd., was used as the winding type sputtering apparatus. Further, an additional first transparent electrode with a substrate was separately prepared in the same manner as above and used as a second transparent electrode with a substrate.

Example 1

Into 100 parts by mass (in terms of a solid component) of an acrylic acid ester copolymer (copolymer of n-butyl acrylate and acrylic acid (90/10); weight-average molecular weight: 700,000; Tg=−45° C.), were added and uniformly dispersed 3.3 parts by mass of an electroluminescent (EL) substance composed of ZnS.Cu ("GG25 Blue Green" available from Osram Sylvania Corp.; average particle size: 27 μm), 0.3 part by mass (in terms of a solid component) of a higher fatty acid amide-based precipitation inhibitor ("6900-20X" available from Kusumoto Chemicals Ltd.) and toluene, to thereby prepare a coating solution of a luminescent composition having a solid concentration of 34% by mass.

Next, the thus prepared coating solution of the luminescent composition was applied onto the first transparent electrode with the substrate obtained in Production Example 1 using a knife coater, and then dried at 110° C. for 2 min to form an inorganic electroluminescent layer having a thickness of 50 μM, thereby obtaining a first laminate. Then, the thus obtained first laminate was faced on the second transparent electrode with the substrate obtained in Production Example 1 such that the inorganic electroluminescent layer was opposed to the second transparent electrode, and then pressed and bonded thereto to produce an inorganic electroluminescent sheet.

As a result, it was confirmed that the thus obtained inorganic electroluminescent sheet had light transmittance of 82.98%, a haze value of 8.04 and a luminance of 1.7 cd/m$^2$, and the luminescent color emitted therefrom was blue.

Examples 2 to 8

The same procedure as in Example 1 was repeated except that the amount of the EL substance composed of ZnS.Cu used was changed to those shown in Table 2, thereby obtaining inorganic electroluminescent sheets.

The light transmittance, haze value, luminance and luminescent color of the thus obtained inorganic electroluminescent sheets are shown in Table 2.

Example 9

The same procedure as in Example 3 was repeated except that 0.23 part by mass of a fluorescent pigment ("SEL-101" available from Sinloihi Co., Ltd.) as a luminescent color modifier was further added to the luminescent composition prepared in Example 3, thereby obtaining an inorganic electroluminescent sheet.

The light transmittance, haze value, luminance and luminescent color of the thus obtained inorganic electroluminescent sheet are shown in Table 2.

Example 10

The same procedure as in Example 3 was repeated except that 4 parts by mass of an ultraviolet absorber ("CGL777MPAD" available from Ciba Japan Co., Ltd.; tris(hydroxyphenyl)triazine compound; solid content: 80% by mass) were further added to the luminescent composition prepared in Example 3, thereby obtaining an inorganic electroluminescent sheet.

The light transmittance, haze value, luminance and luminescent color of the thus obtained inorganic electroluminescent sheet are shown in Table 2.

Example 11

The same procedure as in Example 3 was repeated except that 40 parts by mass of an infrared absorber ("YMF-01" available from Sumitomo Metal Mining Co., Ltd.; composite tungsten oxide containing cesium in an amount of 33 mol % based on tungsten; concentration: 10% by mass) were further added to the luminescent composition prepared in Example 3, thereby obtaining an inorganic electroluminescent sheet.

The light transmittance, haze value, luminance and luminescent color of the thus obtained inorganic electroluminescent sheet are shown in Table 2.

Example 12

The same procedure as in Example 1 was repeated except that no precipitation inhibitor was used therein, thereby obtaining an inorganic electroluminescent sheet. The light transmittance, haze value, luminance and luminescent color of the thus obtained inorganic electroluminescent sheet are shown in Table 2.

Example 13

The same procedure as in Example 3 was repeated except that no precipitation inhibitor was used therein, thereby obtaining an inorganic electroluminescent sheet. The light transmittance, haze value, luminance and luminescent color of the thus obtained inorganic electroluminescent sheet are shown in Table 2.

Example 14

The same procedure as in Example 7 was repeated except that no precipitation inhibitor was used therein, thereby obtaining an inorganic electroluminescent sheet. The light transmittance, haze value, luminance and luminescent color of the thus obtained inorganic electroluminescent sheet are shown in Table 2.

Example 15

One hundred parts by mass of an ethylene-vinyl acetate copolymer resin ("EVAFLEX EV150" available from DuPont-Mitsui Polychemical Co., Ltd; softening point: 34° C.) and 50 parts by mass of an electroluminescent (EL) substance composed of ZnS.Cu ("GGS 42 Green" available from Osram Sylvania Corp.; average particle size: 25 μm) were kneaded together at 130° C. using a twin-screw extrusion kneader ("KZW25TWIN-30MG-STM" available from Technovel Corporation) to prepare pellets. Then, the thus obtained pellets were extruded on the second transparent electrode with the substrate obtained in Production Example 1 at a die temperature of 115° C. using an extrusion tester ("Laboplastomill 30C150" available from Toyo Seiki Seisakusho Co., Ltd.) to form a 50 μm-thick sheet-like luminescent member as an inorganic electroluminescent layer laminated on the second transparent electrode, thereby obtaining a second laminate.

Next, a surface of the inorganic electroluminescent layer of the thus obtained second laminate was heat-laminated at 150° C. over the first transparent electrode with the substrate obtained in Production Example 1 (first laminate) at a winding position for the second laminate, and thereby bonded thereto, to prepare an inorganic electroluminescent sheet. The light transmittance, haze value, luminance and luminescent color of the thus obtained inorganic electroluminescent sheet as well as the breaking strength of the sheet-like luminescent member are shown in Table 2.

Example 16

The same procedure as in Example 1 was repeated except that an n-butyl acrylate-acrylic acid copolymer (n-butyl acrylate/acrylic acid=80/20; glass transition temperature: −34° C.; weight-average molecular weight: 800,000) was used as the acrylic acid ester copolymer, thereby obtaining an inorganic electroluminescent sheet. The light transmittance, haze value, luminance and luminescent color of the thus obtained inorganic electroluminescent sheet are shown in Table 2.

Example 17

The same procedure as in Example 1 was repeated except that an n-butyl acrylate-acrylic acid copolymer (n-butyl acrylate/acrylic acid=70/30; glass transition temperature: −23° C.; weight-average molecular weight: 800,000) was used as the acrylic acid ester copolymer, thereby obtaining an inorganic electroluminescent sheet. The light transmittance, haze value, luminance and luminescent color of the thus obtained inorganic electroluminescent sheet are shown in Table 2.

Example 18

The same procedure as in Example 15 was repeated except that a polyethylene terephthalate ("KURAPET KS710B"

available from Kuraray Co., Ltd.; softening point: 230° C.) was used in place of the ethylene-vinyl acetate copolymer resin, and the kneaded temperature and the die temperature were set to 315° C. and 305° C., respectively, thereby obtaining an inorganic electroluminescent sheet. The light transmittance, haze value, luminance and luminescent color of the thus obtained inorganic electroluminescent sheet as well as the breaking strength of the sheet-like luminescent member are shown in Table 2.

Comparative Examples 1 to 3

The same procedure as in Example 1 was repeated except that the EL substance composed of ZnS.Cu was used in the amounts shown in Table 2, thereby obtaining inorganic electroluminescent sheets.

The visible light transmittance, haze value, luminance and luminescent color of the thus obtained inorganic electroluminescent sheets are shown in Table 2.

TABLE 2

| | Content of inorganic electroluminescent substance (mass part*[1]) | Additives*[2] | Light transmittance*[3] (%) | Haze |
|---|---|---|---|---|
| Example 1 | 3.3 | A | 82.98 | 8.04 |
| Example 2 | 5.0 | A | 81.98 | 8.82 |
| Example 3 | 6.7 | A | 81.21 | 9.76 |
| Example 4 | 11.1 | A | 79.9 | 11.56 |
| Example 5 | 12 | A | 75.67 | 18.27 |
| Example 6 | 33.3 | A | 72.10 | 25.65 |
| Example 7 | 50 | A | 65.22 | 41.22 |
| Example 8 | 99 | A | 60.01 | 56.62 |
| Example 9 | 6.7 | A, B | 75.51 | 9.77 |
| Example 10 | 6.7 | A, C | 80.13 | 9.75 |
| Example 11 | 6.7 | A, D | 74.15 | 9.99 |
| Example 12 | 3.3 | — | 83.02 | 8.01 |
| Example 13 | 6.7 | — | 81.18 | 9.66 |
| Example 14 | 50 | — | 65.30 | 41.35 |
| Example 15 | 50 | — | 65.23 | 40.98 |
| Example 16 | 6.7 | A | 82.95 | 8.02 |
| Example 17 | 50 | A | 82.93 | 8.03 |
| Example 18 | 50 | — | 65.45 | 41.01 |
| Comparative Example 1 | 105 | A | 56.21 | 65.78 |
| Comparative Example 2 | 200 | A | 41.23 | 85.22 |
| Comparative Example 3 | 0.2 | A | 88.21 | 5.21 |

| | Luminescent color: chromaticity (x, y) | Luminance (cd/m$^2$) | Breaking strength (MPa) |
|---|---|---|---|
| Example 1 | Blue (0.16, 0.32) | 1.70 | — |
| Example 2 | Blue (0.16, 0.32) | 3.18 | — |
| Example 3 | Blue (0.16, 0.32) | 4.18 | — |
| Example 4 | Blue (0.16, 0.32) | 6.67 | — |
| Example 5 | Blue (0.16, 0.32) | 12.13 | — |
| Example 6 | Blue (0.16, 0.32) | 21.76 | — |
| Example 7 | Blue (0.16, 0.32) | 38.88 | — |
| Example 8 | Blue (0.16, 0.32) | 57.33 | — |
| Example 9 | White (0.30, 0.34) | 4.32 | — |
| Example 10 | Blue (0.16, 0.32) | 4.33 | — |
| Example 11 | Blue (0.16, 0.32) | 4.21 | — |
| Example 12 | Blue (0.16, 0.32) | 1.71 | — |
| Example 13 | Blue (0.16, 0.32) | 4.23 | — |
| Example 14 | Blue (0.16, 0.32) | 39.00 | — |
| Example 15 | Blue (0.16, 0.32) | 40.10 | 7.21 |
| Example 16 | Blue (0.16, 0.32) | 1.70 | — |
| Example 17 | Blue (0.16, 0.32) | 1.71 | — |
| Example 18 | Blue (0.16, 0.32) | 40.41 | 46.2 |
| Comparative Example 1 | Blue (0.16, 0.32) | 67.86 | — |
| Comparative Example 2 | Blue (0.16, 0.32) | 88.95 | — |
| Comparative Example 3 | Blue (0.16, 0.32) | 0.21 | — |

Note
*[1]Content (parts by mass) based on 100 parts by mass of the binder resin.
*[2]A: Precipitation inhibitor; B: Red pigment; C: Ultraviolet absorber; D: Infrared absorber.
*[3]Light transmittance (%) as measured at a wavelength of 550 nm.

The inorganic electroluminescent sheets obtained in the above Examples had a light transmittance of 60% or more, a haze of less than 60 and a luminance of 1.5 cd/m$^2$, and therefore were each a sheet having an excellent performance which was excellent in balance between light transmittance, haze and luminance. On the other hand, the electroluminescent sheets obtained in Comparative Examples 1 and 2 in which the content of the inorganic electroluminescent substance was large, had a light transmittance as low as less than 60% and a haze as large as 60 or more, and therefore failed to exhibit a sufficient performance required for electroluminescent sheets. In addition, the electroluminescent sheet obtained in Comparative Example 3 having a small content of the inorganic electroluminescent substance had a luminance as low as 0.21 cd/m$^2$ and therefore failed to exhibit a sufficient luminance.

INDUSTRIAL APPLICABILITY

The luminescent composition of the present invention is capable of providing an inorganic electroluminescent sheet with a high productivity at low costs in an efficient manner, and has a desired light transmittance (transparency) when no electric voltage is applied thereto. The inorganic electroluminescent sheet obtained using the luminescent composition of the present invention can be suitably used as a back light for advertising media and decorating media which are disposed on windows of commercial buildings or automobiles, or security sheets, etc., and can be especially suitably used as a member for protection of privacy which may be fitted to windows of vehicles, buildings, or houses in view of an excellent transparency thereof.

The invention claimed is:
1. An inorganic electroluminescent sheet, comprising:
   a first transparent substrate;
   a first transparent electrode;
   an inorganic electroluminescent layer;
   a second transparent electrode; and
   a second transparent substrate,
   which are successively laminated in this order,
   wherein the inorganic electroluminescent layer comprises a luminescent composition comprising an inorganic electroluminescent substance and a binder resin,
   the binder resin has a glass transition temperature of from −70 to 5° C.,
   a mass ratio of the inorganic electroluminescent substance to the binder resin is at least 0.5:100 and less than 100:100, and
   the inorganic electroluminescent sheet has a light transmittance of 60% or more as measured at a wavelength of 550 nm under a non-light emitting condition.
2. The inorganic electroluminescent sheet according to claim 1, wherein the binder resin is a thermoplastic resin having a softening point of from 30 to 270° C.
3. The inorganic electroluminescent sheet according to claim 2, wherein the luminescent composition further comprises a precipitation inhibitor.

4. The inorganic electroluminescent sheet according to claim 2, wherein the luminescent composition further comprises a luminescent color modifier.

5. The inorganic electroluminescent sheet according to claim 2, wherein the luminescent composition further comprises at least one material selected from the group consisting of an ultraviolet absorber and an infrared absorber.

6. The inorganic electroluminescent sheet according to claim 1, wherein the luminescent composition further comprises a precipitation inhibitor.

7. The inorganic electroluminescent sheet according to claim 6, wherein the luminescent composition further comprises a luminescent color modifier.

8. The inorganic electroluminescent sheet according to claim 1, wherein the luminescent composition further comprises a luminescent color modifier.

9. The inorganic electroluminescent sheet according to claim 1, wherein the luminescent composition further comprises at least one material selected from the group consisting of an ultraviolet absorber and an infrared absorber.

10. A process for producing the inorganic electroluminescent sheet of claim 1, the process comprising:
   successively forming the first transparent electrode and the inorganic electroluminescent layer on the first transparent substrate, thereby preparing a first laminate, and separately forming the second transparent electrode on the second transparent substrate, thereby preparing a second laminate; or
   forming the first transparent electrode on the first transparent substrate, thereby preparing a first laminate, and separately successively forming the second transparent electrode and the inorganic electroluminescent layer on the second transparent substrate, thereby preparing a second laminate; and
   bonding a side of the inorganic electroluminescent layer of the first laminate to a side of the second transparent electrode of the second laminate, or bonding a side of the first transparent electrode of the first laminate to a side of the inorganic electroluminescent layer of the second laminate.

11. The inorganic electroluminescent sheet according to claim 1, wherein the first and second electrodes comprise indium tin oxide.

12. The inorganic electroluminescent sheet according to claim 11, wherein the binder resin is a thermoplastic resin having a softening point of from 30 to 270° C.

13. The inorganic electroluminescent sheet according to claim 1, wherein the inorganic electroluminescent layer consists of the luminescent composition.

14. The inorganic electroluminescent sheet according to claim 1, wherein the mass ratio of the inorganic electroluminescent substance to the binder resin is at least 1:100 and less than 20:100.

15. The inorganic electroluminescent sheet according to claim 1, wherein the mass ratio of the inorganic electroluminescent substance to the binder resin is 50:100 or less.

16. The inorganic electroluminescent sheet according to claim 1, wherein the binder resin is a pressure-sensitive adhesive resin having a glass transition temperature of from −70 to 5° C.

17. The inorganic electroluminescent sheet according to claim 1, wherein the binder resin comprises an acrylic resin.

18. The inorganic electroluminescent sheet according to claim 17, wherein the acrylic resin comprises a (meth)acrylic acid ester copolymer.

19. The inorganic electroluminescent sheet according to claim 18, wherein the (meth)acrylic acid ester copolymer is a copolymer of at least a (meth)acrylic acid ester having an ester moiety comprising an alkyl group having from 1 to 20 carbon atoms and a monomer having a carboxyl group.

* * * * *